US012311387B2

(12) United States Patent
Larsson

(10) Patent No.: US 12,311,387 B2
(45) Date of Patent: May 27, 2025

(54) CENTRIFUGAL SEPARATOR FOR SEPARATING A LIQUID MIXTURE

(71) Applicant: Alfa Laval Corporate AB, Lund (SE)

(72) Inventor: Per-Gustaf Larsson, Huddinge (SE)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 17/912,930

(22) PCT Filed: Mar. 17, 2021

(86) PCT No.: PCT/EP2021/056832
§ 371 (c)(1),
(2) Date: Sep. 20, 2022

(87) PCT Pub. No.: WO2021/191023
PCT Pub. Date: Sep. 30, 2021

(65) Prior Publication Data

US 2023/0128374 A1 Apr. 27, 2023

(30) Foreign Application Priority Data

Mar. 26, 2020 (EP) .................................... 20165833

(51) Int. Cl.
*B04B 11/02* (2006.01)
*B04B 1/08* (2006.01)

(52) U.S. Cl.
CPC ................ *B04B 11/02* (2013.01); *B04B 1/08* (2013.01)

(58) Field of Classification Search
CPC ................................. B04B 11/02; B04B 1/08
See application file for complete search history.

(56) References Cited

U.S. PATENT DOCUMENTS 2,369,822 A * 2/1945 Flowers .................... B04B 1/08 494/64
3,167,509 A 1/1965 Steinacker
(Continued)

FOREIGN PATENT DOCUMENTS

CN 1154079 A 7/1997
CN 1356146 A 7/2002
(Continued)

OTHER PUBLICATIONS

WO 2010119164 ProQuest Machine Translation.*
(Continued)

*Primary Examiner* — Krishnan S Menon
*Assistant Examiner* — Shuyi S. Liu
(74) *Attorney, Agent, or Firm* — Birch, Stewart, Kolasch & Birch, LLP

(57) ABSTRACT

A separation system for separating a liquid mixture includes a centrifugal separator. The centrifugal separator includes a stationary frame, a rotatable assembly and a drive unit for rotating the rotatable assembly relative the frame around an axis of rotation. The separator further includes a feed inlet for receiving a liquid mixture to be separated, a first liquid outlet for discharge of a separated liquid light phase and a second liquid outlet for discharge of a liquid heavy phase having a density that is higher than said liquid light phase. The rotatable assembly includes a rotor casing enclosing a separation space in which a stack of separation discs is arranged to rotate around a vertical axis of rotation. The separation space is arranged for receiving liquid mixture from said feed inlet. The separation system further includes a container arranged downstream of said first and/or second liquid outlet for receiving discharged liquid phase, and a scale for measuring the weight of discharged liquid phase contained in said container.

15 Claims, 6 Drawing Sheets

(56) References Cited

U.S. PATENT DOCUMENTS

| | | | | |
|---|---|---|---|---|
| 3,255,958 | A | 6/1966 | Simon | |
| 4,952,127 | A | 8/1990 | Schmeisser et al. | |
| 5,318,500 | A | 6/1994 | Kelley et al. | |
| 5,637,082 | A | 6/1997 | Pages et al. | |
| 9,645,006 | B2 * | 5/2017 | Phelan | G01F 25/10 |
| 2002/0099319 | A1 | 7/2002 | Saito et al. | |
| 2013/0341275 | A1 * | 12/2013 | Kusters | A61M 1/362266 210/216 |
| 2014/0235422 | A1 | 8/2014 | Isaksson et al. | |
| 2017/0135382 | A1 | 5/2017 | Avergard et al. | |
| 2017/0203306 | A1 * | 7/2017 | Penkl | B04B 11/02 |
| 2017/0296727 | A1 * | 10/2017 | Burbank | A61M 1/165 |
| 2019/0201916 | A1 * | 7/2019 | Min | A61M 1/029 |

FOREIGN PATENT DOCUMENTS

| | | | | |
|---|---|---|---|---|
| CN | 102613979 | A | 8/2012 | |
| CN | 107530716 | A | 1/2018 | |
| CN | 108698051 | A | 10/2018 | |
| DE | 3147613 | A1 * | 6/1983 | |
| DE | 34 30 264 | A1 | 2/1986 | |
| DE | 38 31 771 | A1 | 3/1990 | |
| EP | 2181744 | A1 * | 5/2010 | B01D 17/0217 |
| EP | 3 085 449 | A1 | 10/2016 | |
| EP | 3 167 721 | A1 | 5/2017 | |
| EP | 3 666 388 | A1 | 6/2020 | |
| ES | 2 354 794 | A1 | 3/2011 | |
| GB | 483438 | A | 4/1938 | |
| GB | 731269 | | 6/1955 | |
| JP | 57-56720 | A | 4/1982 | |
| JP | 57056720 | * | 5/1982 | |
| JP | 58-186019 | A | 10/1983 | |
| JP | 11-262686 | A | 9/1999 | |
| JP | 2005-177191 | A | 7/2005 | |
| JP | 4043062 | B2 * | 2/2008 | A61M 1/30 |
| JP | 2010-46436 | A | 3/2010 | |
| JP | 2017-6883 | A | 1/2017 | |
| JP | 20176883 | * | 1/2017 | |
| WO | WO 9603214 | A1 | 2/1996 | |
| WO | WO-2010119164 | A1 * | 10/2010 | A61B 10/0045 |
| WO | WO 2012/125480 | A1 | 9/2012 | |
| WO | WO 2015/181177 | A1 | 12/2015 | |
| WO | WO 2017/144339 | A1 | 8/2017 | |

OTHER PUBLICATIONS

International Search Report, issued in PCT/EP2021/056832, dated Jun. 17, 2021.

Pope et al., "NIST's Fully Dynamic Gravimetric Liquid Flowmeter Standard", 9th ISFFM, Arlington, Virginina, Apr. 14 to 17, 2015, total 15 pages.

Written Opinion of the International Searching Authority, issued in PCT/EP2021/056832, dated Jun. 17, 2021.

"Alfa Laval contherm at Sparta Gourmet mill," YouTube, 2017, URL; <https://www.youtube.com/watch?v=Jv8jOt2p6-g>.

"Mechanische Verfahrenstechnik I and II," Lerninhalte des Pflichtmoduls, 5 pages total.

"Mitseas Olive Press in Analipsi, Messinia," YouTube, 2016, URL: < https://www.youtube.com/watch?v=R-3DxdsMpXE>.

Aguilera Mena, "Dynamic weighing calibration method for liquid flowmeters—A new approach," Dissertation, 2012, 154 pages total.

Brunner, "Zentrifugalseparatoren für die Aufarbeitung biotechnologischer Produkte," Internationale Zeitschrift für Biotech., 1985, Heft 3, 11 pages total.

European Communication of a notice of opposition for European Application No. 20165833.3, dated Apr. 26, 2023, with an English translation.

Mannweiler et al., "The scale-down of an industrial disc stack centrifuge," Bioprocess Engineering, vol. 8, 1992, pp. 19-25.

Observations by third parties for Patent Application EP 3 885 050 A1 (EP 20 165 833.3), dated Jan. 14, 2022.

Product description for UVPX 507 Olive Oil Separator, Alfa Laval, 2 pages total.

Source Code Webpage, URL: <https://web.archive.org/web/20180303104856/https://www.alfalaval.lat/productos-y-soluciones/separacic 33 pages total.

Time stamp for Youtube Video "Alfa Laval contherm at Sparta Gourmet mill," 2017, 1 page total.

Time stamp for Youtube Video "Mitseas Olive Press in Analipsi, Messinia," 2016, 2 pages total.

Werner H. Stahl, "Industrie-Zentrifugen, Band II," Zürichsee Druckereien, 2004, Kapitel 6—Separatoren, 5 pages total.

Werner H. Stahl, Industrie-Zentrifugen, Band III, Betriebstechnik & Prozessintegration, Zürichsee Druckereien, 2008, Kapitel 14, 10 pages total.

Observations by third party for Application No. 21711905.6 dated Aug. 11, 2023.

English translation of the Japanese Office Action for Japanese Application No. 2022-557942, dated Oct. 16, 2023.

Korean Office Action for Korean Application No. 10-2022-7036721, dated Dec. 21, 2023.

Chinese Office Action and Search Report for Chinese Application No. 202180038039.0, dated May 17, 2024, with English translation.

* cited by examiner

CENTRIFUGAL SEPARATOR FOR SEPARATING A LIQUID MIXTURE

TECHNICAL FIELD

The present inventive concept relates to the field of centrifugal separators.

More particularly it relates to a centrifugal separator method for measuring the liquid flow of a separated phase from a centrifugal separator.

BACKGROUND

Centrifugal separators are generally used for separation of liquids and/or solids from a liquid mixture or a gas mixture. During operation, fluid mixture that is about to be separated is introduced into a rotating bowl and due to the centrifugal forces, heavy particles or denser liquid, such as water, accumulates at the periphery of the rotating bowl whereas less dense liquid accumulates closer to the central axis of rotation. This allows for collection of the separated fractions, e.g. by means of different outlets arranged at the periphery and close to the rotational axis, respectively.

WO 2015/181177 discloses a separator for the centrifugal processing of a pharmaceutical product, such as a fermentation broth. The separator comprises a rotatable outer drum and an exchangeable inner drum arranged in the outer drum. The inner drum comprises means for clarifying the flowable product. The outer drum is driven via drive spindle by a motor arranged below the outer drum. The inner drum extends vertically upwardly through the outer drum which fluid connections arranged at an upper end of the separator.

The traditional way of measuring a liquid flow of the separated liquid phase from a centrifugal separator is using a flow sensor. Flow sensors are expensive in general and it may be difficult to select an appropriate flow sensor for a specific application since flow sensors may depend on several different measuring principles, all with their own advantages and disadvantages. Measurement errors normally occur if one wants to measure different liquids with the same flow sensor or if the temperature or liquid composition varies over time.

There is thus a need in the art for improved methods for methods for measuring the flow of a separated liquid phase from a centrifugal separator.

SUMMARY

It is an object of the invention to at least partly overcome one or more limitations of the prior art. In particular, it is an object to provide a separator and a method for determining the flow rate of a discharged liquid phase.

As a first aspect of the invention, there is provided a separation system for separating a liquid mixture comprising a centrifugal separator. The centrifugal separator comprises

- a stationary frame,
- a rotatable assembly and a drive unit for rotating the rotatable assembly relative the frame around an axis of rotation;
- a feed inlet or receiving a liquid mixture to be separated,
- a first liquid outlet for discharge of a separated liquid light phase and a second liquid outlet for discharge of a liquid heavy phase having a density that is higher than said liquid light phase;
- wherein the rotatable assembly comprises a rotor casing enclosing a separation space in which a stack of separation discs is arranged to rotate around the axis of rotation, wherein the separation space is arranged for receiving liquid mixture from said feed inlet.

The separation system further comprises

- a container arranged downstream of said first and/or second liquid outlet of the centrifugal separator and arranged for receiving discharged liquid phase, and
- a scale for measuring a weight of discharged liquid phase contained in said container.

The stationary frame of the centrifugal separator is a non-rotating part, and the rotatable assembly is supported by the frame, e.g. by means of at least one bearing, for example a ball bearing.

The centrifugal separator further comprises a drive unit arranged for rotating the rotatable assembly and may comprise an electrical motor or be arranged to rotate the rotatable assembly by a suitable transmission, such as a belt or a gear transmission. Thus, the drive unit may be arranged to drive the rotatable assembly directly or indirectly via a transmission.

The rotatable assembly comprises a rotor casing in which the separation takes place. The rotor casing encloses a separation space in which the separation of the fluid mixture, such as a cell culture mixture, takes place. The rotor casing may be a solid rotor casing and be free of any further outlets for separated phases. Thus, the solid rotor casing may be solid in that it is free of any peripheral ports for discharging e.g. a sludge phase accumulated at the periphery of the separation space. However, in embodiments, the rotor casing comprises peripheral ports for intermittent or continuous discharge of a separated phase from the periphery of the separation space.

The feed inlet is for receiving the liquid mixture to be separated and for guiding the feed to the separation space. The separation space comprises a stack of separation discs arranged centrally around the axis of rotation. The stack may comprise frustoconical separation discs.

The separation discs may thus have a frustoconical shape, which refers to a shape having the shape of a frustum of a cone, which is the shape of a cone with the narrow end, or tip, removed. A frustoconical shape has thus an imaginary apex where the tip or apex of the corresponding conical shape is located. The axis of the frustoconical shape is axially aligned with the axis of rotation of the solid rotor casing. The axis of the frustoconical portion is the direction of the height of the corresponding conical shape or the direction of the axis passing through the apex of the corresponding conical shape.

The separation discs may alternatively be axial discs arranged around the axis of rotation.

The separation discs may e.g. comprise a metal or be of metal material, such as stainless steel. The separation discs may further comprise a plastic material or be of a plastic material.

The centrifugal separator separates the liquid mixture into at least a first and second liquid phase. Separated liquid phases are discharged via the first and second liquid outlets. The first liquid outlet, also denoted liquid light outlet, is for discharging a separated liquid phase of a lower density, whereas the second liquid outlet, also called the liquid heavy outlet, is for separating a phase of a higher density than the liquid phase that is discharged via the first liquid outlet.

The first aspect of the invention is based on the insight that the flow entering a container arranged downstream of the first or second liquid outlet may easily be determined if the container is e.g. standing on or is suspended in a scale and the change in weight of the scale is evaluated over time. This container may be arranged for being cyclically filled and emptied, and during filling up of the container and when no liquid is leaving the container, the weight increase over time may be evaluated and the liquid flow rate, e.g. the volume flow or the mass flow, may be determined.

The mass flow may be calculated by determining a weight increase ($\Delta w$) of the container during a time interval ($\Delta t$), and then estimate $\Delta w/\Delta t$. The volume flow may be determined from the mass flow using the density of the liquid phase entering the container.

Even when the liquid density is unknown, the use of a scale for measuring and evaluating the weight changes over time may give less measurement errors than traditional flow sensors. If the liquid phase measured has a relatively low variation in density, measurement error will be very small. As an example, if the density is varying between 1000 to 1050 $kg/m^3$, and the density value in the flow rate calculations is set to 1025 $kg/m^3$ (e.g. if the exact density is not known), the measuring error of the volume flow will be as small as +/−2.5%, which is lower than the measuring error in traditional flow sensors. If the exact density of the liquid phase measured is known, then the measurement error of the volume flow may be more or less down to a minimum. Further, the measurement error of a determined mass flow may also be down to a minimum.

The container may be arranged either downstream of the first liquid outlet or downstream of the second liquid outlet. In embodiments, there is a container and scale arranged downstream of both liquid outlets.

The container may be arranged to stand on the scale or be suspended in the scale. Thus, in embodiments of the present invention, the container is arranged on the scale or suspended in the scale, thereby providing measuring the weight of discharged liquid phase contained in the container.

The container is arranged for being filled up and emptied, e.g. in a cyclic manner. Thus, in embodiments of the first aspect, the container is not a storage container for long term storage of any separated liquid phase.

Consequently, in embodiments of the first aspect, the separation system comprises a tank for receiving liquid phase being emptied from the container.

The tank may be arranged for long term storage of a separated liquid phase. The tank may thus have a volume that is larger than the volume of the container. The tank may have a volume that is at least five, such as at least ten, such as at least 25 times the volume of the container. The tank may e.g. be of stainless steel.

In embodiments, the container is arranged for holding a volume of at least 100 ml, such as at least 500 ml. Moreover, the container may have a maximum volume of less than 2500 ml, such as less than 1500 ml, such as 1000 ml or less.

In embodiments of the first aspect, the container comprises a container inlet for receiving said discharged liquid phase and a container outlet for emptying the liquid phase from the container; and wherein the separation system further comprises valve means for regulating the flow of liquid phase being emptied from the container.

The valve means may be arranged downstream of the container. The valve means may for example be a regulating valve, a shutoff valve, or a peristaltic pump.

In embodiments of the first aspect of the invention, the separation system further comprises a control unit configured for determining the weight increase of said container as a function of time.

The control unit may further be configured to determine or calculate the flow of the liquid phase being discharged to the container based on the measured weight increase as a function of time.

The control unit may comprise computer program products configured for determining the weight increase as a function of time. The control unit may thus comprise a processor and communication interface for communicating with the scale.

For this purpose, the control unit may comprise a device having processing capability in the form of processing unit, such as a central processing unit, which is configured to execute computer code instructions which for instance may be stored on a memory. The processing unit may alternatively be in the form of a hardware component.

As an example, the control unit may further be configured for determining a flow rate of discharged liquid phase based on the measured weight increase of said container as a function of time.

The flow rate may be a mass flow or a volume flow. Moreover, if the separation system comprises valve means for regulating the flow of liquid phase being emptied from the container, the control unit may further be configured to control the valve means. Further, the control unit may also be configured to close the valve means during the determining of the weight increase of the container as a function of time. Controlling the valve means may thus comprise opening and closing the valve means and/or regulating the flow through the valve means.

Thus, the weight increase of the container may be measured when there is no emptying of the container, i.e. when there is just a fill-up of the container. A longer fill-up will result in a larger measurement volume of the container and thus a reduced measurement error.

Furthermore, the control unit may be further configured to open the valve means such that an outlet flow of liquid phase from said container is higher than an inlet flow of liquid phase to said container. This may thus lead to emptying of the container.

Measuring the weight increase of the container, and from that e.g. the flow into the container, may be performed in a cyclic manner. Thus, the control unit may be configured to switch between closing the valve means and opening the valve means such that said container is filled and emptied in cycles.

The control unit may therefore be configured to measure the weight increase of the container during the periods when the valve means is closed, i.e. during several fill-up periods of the container.

In embodiments of the first aspect of the invention, the container is arranged downstream of the first liquid outlet. Consequently, the control unit may be used for measuring the flow of the discharged liquid light phase using information of the weight increase as a function of time of the container.

The use of the container arranged on or suspended in a scale and measuring the weight increase of the container as a function of time allows for omitting the use of further flow sensors since the liquid flow may be determined from the measured weight increase. Consequently, in embodiments of the first aspect, the separation system may be free of any flow sensor arranged downstream of a liquid outlet at which, or downstream which, a container is arranged. That is, the centrifugal separator may be free of any additional flow sensor other than the container and scale arranged downstream of the relevant liquid outlet.

As a second aspect of the invention, there is provided a method for determining the flow rate of a liquid phase being discharged from a centrifugal separator. The method comprises the steps of a) providing a separation system according to the first aspect discussed herein above;
b) supplying feed to said feed inlet and discharging a separated liquid light phase from said first liquid outlet and discharging a separated liquid heavy phase from said second liquid outlet;
c) measuring a weight increase of said container as a function of time; and
d) determining a flow rate of said liquid phase being discharged to said container based on the measured weight increase of step c).

This aspect may generally present the same or corresponding advantages as the former aspect. Effects and features of this second aspect are largely analogous to those described above in connection with the first aspect. Embodiments mentioned in relation to the first aspect are largely compatible with the second aspect.

Step b) of supplying feed may for example be performed by the use of a feed pump, as known in the art.

Steps c) and d) may be performed by a control unit as discussed in relation to the first aspect above.

In embodiments of the second aspect, step c) may further comprise step c1) of stopping a flow of separated liquid phase out from said container during said measuring of the weight increase of said container as a function of time.

As discussed in relation to the first aspect above, the weight measurements may thus be performed during fill-up of the container.

Moreover, step c) may comprise a step c2) of starting the flow of separated liquid phase out from said container, thereby emptying said container after said measuring of the weight increase of said container as a function of time.

The flow of separated phase out from the container may be performed during inflow of the container, e.g. with a higher flow rate of separated liquid phase out from the container than the flow rate of separated liquid phase into the container. In this way, the container may be emptied even though there is a flow into the container.

Filling up and emptying the container may be performed several times, e.g. in a cyclic manner. Thus, step c) may comprise repeating steps c1) and c2).

The container and scale may be used together with another flow sensor. In this way, such other flow sensor may be adjusted, such as calibrated, using the measured weight increase as function of time of the container.

Consequently, in embodiments of the second aspect, the method is further comprising adjusting a flow sensor arranged downstream of the same liquid outlet at which said container is arranged based on the determined flow rate of said liquid phase in step d). The adjusting of a flow sensor may be a calibration of the flow sensor.

The centrifugal separator used in the different aspects of the invention may be the same centrifugal separator. Thus, the features discussed in relation to the centrifugal separator may be features of the centrifugal separator in both the first and second aspects of the invention.

In embodiments of the first and second aspects of the invention, the feed inlet and the two liquid outlets of the centrifugal separator may be mechanically hermetically sealed.

A mechanical hermetic seal refers to a seal that provides an air tight seal between a stationary portion, such as a conduit for transporting liquid mixture to be separated or a separated liquid phase, and the rotor casing. The mechanical hermetic seal further decreases the risk of air from outside the rotor casing to contaminate the feed and also decreases the risk of feed escaping from the separation space. Therefore, the rotor casing may be arranged to be completely filled with liquid, such as cell culture mixture, during operation. This means that no air or free liquid surfaces is meant to be present in the rotor casing during operation.

A mechanically hermetically sealed inlet is for receiving the fluid to be separated and to guide the fluid to the separation space. Also the first and second liquid outlets may be mechanically hermetically sealed.

In embodiments of the first and second aspects, the inlet is arranged at a first axial end of said rotor casing and arranged so that the liquid mixture to be separated enters said rotor casing at the axis of rotation Further, the second liquid outlet may be arranged at a second axial end of said rotor casing opposite said first end and arranged so that said separated heavy phase is discharged at the rotational axis (X). Thus, the inlet may be arranged at a first axial end, such as the lower axial end, of the rotor casing whereas the second mechanically hermetically sealed liquid outlet is arranged at the opposite axial end, such as the upper axial end, of the rotor. The first mechanically hermetically sealed liquid outlet for discharge of a separated liquid phase may be arranged at the lower axial end or at the upper axial end of the rotor casing.

It may be advantageous if e.g. a cell culture can enter and leave the rotating parts of the separator at the axis of rotation. This imparts less rotational energy on the separated cells that leave the separator and thus decreases the risk of cell breakage. Separated heavy phase, such as a cell phase, may be discharged from the rotor casing, and from the rotatable assembly, at the axis of rotation.

In embodiments of the first and second aspects, the centrifugal separator further comprises a first rotatable seal for sealing and connecting said inlet to a stationary inlet conduit, wherein at least a part of said stationary inlet conduit is arranged around the axis of rotation.

The first rotatable seal may thus be a mechanical hermetic seal, which is a rotatable seal for connecting and sealing the inlet to a stationary inlet conduit. The first rotatable seal may be arranged as a part of an interface between the rotor casing and the stationary portion of the frame and may thus comprise a stationary part and a rotatable part.

The stationary inlet conduit may thus also be part of the stationary frame and is arranged at the axis of rotation.

The first rotatable seal may be a double seal that also seals the first mechanically hermetically sealed liquid outlet for discharging one of the separated liquid phases.

In embodiments of the first and second aspects of the invention, the centrifugal separator further comprises a second rotatable seal for sealing and connecting said second liquid outlet to a stationary outlet conduit arranged around the axis of rotation.

In analogy, the second rotatable seal may also be a mechanical hermetic seal, which is a rotatable seal for connecting and sealing the outlet to a stationary outlet conduit. The second rotatable seal may be arranged as part of an interface between the rotor casing and the stationary portion of the frame and may thus comprise a stationary part and a rotatable part.

The stationary outlet conduit may thus also be part of the stationary frame and is arranged at the axis of rotation.

In embodiments of the first and second aspects of the invention, the rotatable assembly may comprise an exchangeable separation insert and a rotatable member; said insert comprising said rotor casing and being supported by said rotatable member.

The exchangeable separation insert may thus be a pre-assembled insert being mounted into the rotatable member, which may function as a rotatable support for the insert. The exchangeable insert may thus easily be inserted into and taken out of the rotatable member as a single unit.

According to embodiments, the exchangeable separation insert is a single use separation insert. Thus, the insert may be adapted for single use and be a disposable insert. The exchangeable insert may thus be for processing of one product batch, such as a single product batch in the pharmaceutical industry, and then be disposed.

The exchangeable separation insert may comprise a polymeric material or consist of a polymeric material. As an example, the rotor casing and the stack of separation discs may comprise, or be of a polymeric material, such as polypropylene, platinum cured silicone or BPA free polycarbonate. The polymer parts of the insert may be injection moulded. However, the exchangeable separation insert may also comprise metal parts, such as stainless steel. For example, the stack of separation discs may comprise discs of stainless steel.

The exchangeable insert may be a sealed sterile unit.

Further, if the rotatable assembly comprises an exchangeable separation insert and a rotatable member, the rotatable member may be arranged to be solely externally supported by one or more external bearings.

Furthermore, the exchangeable separation insert and the rotatable member may be free of any rotatable shaft that is arranged to be supported by external bearings.

As an example, the outer surface of the exchangeable insert may be engaged within a supporting surface of the rotatable member, thereby supporting said exchangeable insert within said rotatable member.

Consequently, the centrifugal separator may be a modular centrifugal separator or comprising a base unit and the rotatable assembly comprising an exchangeable separation insert. The base unit may comprise a stationary frame and a drive unit for rotating the rotatable assembly about the axis of rotation. The rotatable assembly may have a first axial end and a second axial end, and may delimit an inner space at least in a radial direction, the inner space being configured for receiving at least one part of the exchangeable separation insert therein. The rotatable assembly may be provided with a first through opening to the inner space at the first axial end and configured for a first fluid connection of the exchangeable separation insert to extend through the first through opening. The rotatable assembly may also comprise a second through opening to the inner space at the second axial end and configured for a second fluid connection of the exchangeable separation insert to extend through the second through opening.

In embodiments of the first and second aspects of the invention, the rotatable assembly further comprises at least one outlet conduit for transporting the separated heavy phase from the separation space to the second mechanically hermetically sealed liquid outlet, said conduit extending from a radially outer position of said separation space to said second mechanically hermetically sealed liquid outlet, i.e. the heavy phase outlet. The outlet conduit may have a conduit inlet arranged at the radially outer position and a conduit outlet at a radially inner position. Consequently, then the heavy phase outlet is at the radially inner position. This outlet conduit may be arranged in an upper portion of the separation space.

As an example, the conduit inlet may be arranged at the radially outer position and a conduit outlet at a radially inner position. Further, the at least one outlet conduit may be arranged with an upward tilt from the conduit inlet to the conduit outlet.

Thus, relative a horizontal plane, the outlet conduit may be tilted axially upwards from the conduit inlet in the separation space to the conduit outlet at the heavy phase outlet. This may facilitate transport of the separated cell phase in the outlet conduit.

The conduit inlet may be arranged at an axially upper position in the separation space. The conduit inlet may be arranged at an axial position where the separation space has its largest inner diameter.

The outlet conduit may be a pipe. As an example, the rotatable assembly, e.g. in the rotor casing may comprise a single outlet conduit.

As an example, the at least one outlet conduit is tilted with an upward tilt of at least 2 degrees relative a horizontal plane. As an example, the at least one outlet conduit may be tilted with an upward tilt of at least 5 degrees, such as at least 10 degrees, relative the horizontal plane.

The at least one outlet conduit may facilitate transport of the separated heavy phase in the separation space to the heavy phase outlet.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
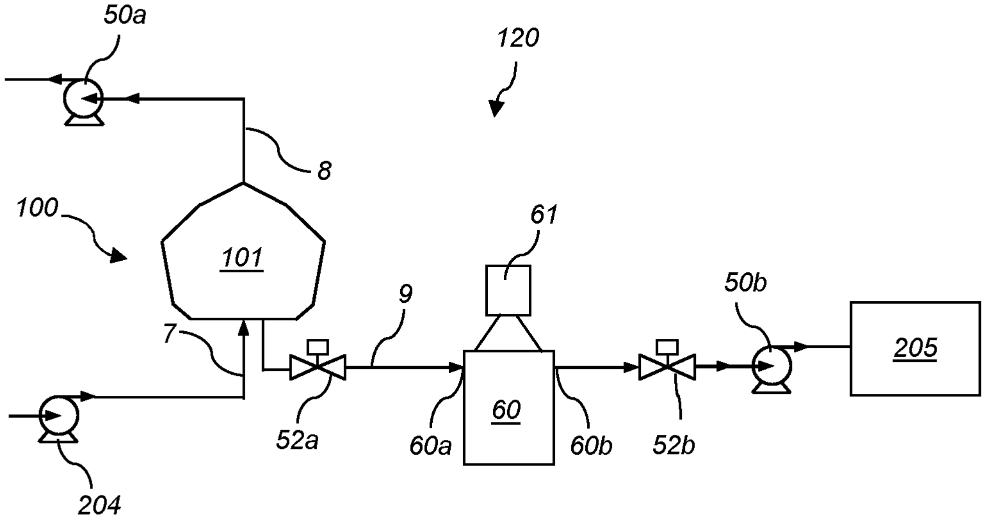
FIG. 1 is a schematic view of a separation system of the present disclosure in which a container and scale is arranged downstream the first liquid outlet.

FIG. 1 schematically shows a separation system 120 according to embodiments including a schematic view of a centrifugal separator 100 of the present disclosure. For clarity reasons, only the outside of a rotatable assembly 101 of the centrifugal separator 100 is shown.

In the centrifugal separator 100 of FIG. 1, liquid mixture to be separated is supplied to the rotatable assembly 101 via stationary inlet pipe 7 by means of a feed pump 204. After separation within a separation space of the rotatable assembly, separated liquid light phase is discharged though a first liquid outlet to a first stationary outlet pipe 9, whereas separated heavy phase is discharged via a second liquid outlet to a second stationary outlet pipe 8.

Downstream of the second liquid outlet, there is a peristaltic pump 50*a* arranged for facilitating discharge of the second liquid phase. The peristaltic pump 50*a* also functions as a regulating valve and may thus be used for regulating the flow, or shutting off the flow, of separated heavy phase being discharged in stationary pipe 8.

Downstream of the first liquid outlet, there is a regulating valve 52*a* for regulating the discharge of separated liquid light phase in stationary outlet pipe 9. Downstream of this regulating valve, there is a container 60 arranged for receiving the discharged liquid light phase. The container has a container inlet 60*a* for receiving the discharged separated liquid light phase and a container outlet 60*b* for emptying the liquid phase from the container 60. The emptying of the container 60 is performed via a shutoff valve 52*b* arranged downstream of the container 60. A positive displacement pump 50*b*, such as a peristaltic pump 50*b*, arranged downstream of the container 60, is used for facilitating the flow from the first liquid outlet and to tank 205.

The container 60 is in this embodiment suspended in a scale 61, which is thus configured for measuring the weight of the container 60. The measured weight of separated liquid light phase in the container is thus a measure of the amount of liquid light phase being discharged, and such measurements of the weight of the scale may be used for calculating the discharged flow rate of the separated liquid light phase.

As also illustrated in FIG. 1, liquid light phase that has been emptied from the container 60 is collected in a tank 205, e.g. in a cyclic manner. This tank 205 has a larger volume than the container 60, and is used for storage of separated liquid light phase, whereas the container 60 suspended in the scale 61 is arranged for being emptied during separation of the liquid mixture in the separator 100. The tank 205 may be used for intermediate storage, or long-term storage, before further processing of the discharged liquid light phase. The tank may have a volume that is at least five times, such as at least ten times, larger than the volume of the container 60.

Figure 2:
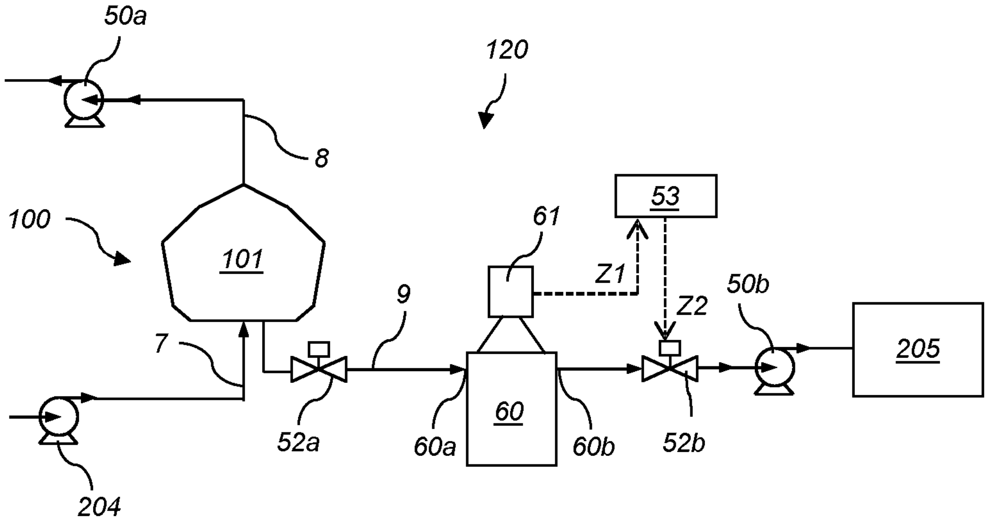
FIG. 2 is a schematic view of the separation system of FIG. 1 further comprising a control unit.

FIG. 2 illustrates an embodiment of a separation system 120. The system 120 has a similar set up as the separation system 120 illustrated in FIG. 1, with the addition of a control unit 53 configured for determining the weight increase the container 60 as a function of time. Thus, the control unit 53 is configured for receiving measurement data of the weight of the container 60, e.g. continuously or at discrete points in time. This is illustrated by arrow "Z1" in FIG. 2. Moreover, the control unit 53 is further configured for determining the flow of discharged separated liquid phase based on the measured weight increase of the container 60 as a function of time. The control unit 53 is in this embodiment also connected to the shutoff valve 52*b*, as illustrated by arrow "Z2". The control unit 53 comprises a communication interface, such as a transmitter/receiver, via which it may receive weight data from the scale 61. The control unit 53 is thus configured for receiving information of the weight as a function of time of the container 60.

The control unit 53 may further be configured to determine the flow rate of liquid light phase being discharged using the measured weight of the container 60 as a function of time. For this purpose, the control unit 53 may comprise a device having processing capability in the form of processing unit, such as a central processing unit, which is configured to execute computer code instructions which for instance may be stored on a memory. The processing unit may alternatively be in the form of a hardware component, such as an application specific integrated circuit, a field-programmable gate array or the like.

The control unit 53 is in this example also configured for regulating the liquid flow through the shutoff valve 52*b*. For this purpose, the processing unit of the control unit 53 may further comprise computer code instructions for sending operational requests to the shutoff valve 52*b*

As an example, the control unit may be configured to close the shutoff valve 52*b* during the measuring of the weight increase of the container 60 as a function of time. Moreover, the control unit 53 may further be configured to open the shutoff valve 52*b* such that the outlet flow of liquid light phase from the container 60 is higher than the inlet flow of liquid light phase to the container 60. In this way, the control unit 53 and the shutoff valve 52*b* are used for emptying the container 60 with the pump 50*b*.

As a further example, the control unit 53 may be configured to switch between closing the shutoff valve 52*b* and opening the shutoff valve 52*b* such that the container 60 is filled and emptied in cycles. This means that the measurement of the weight increase as a function of time may be performed on regular basis, i.e. the flow rate of liquid light phase may be determined regularly during processing of the liquid mixture in the centrifugal separator 100.

Figure 3:
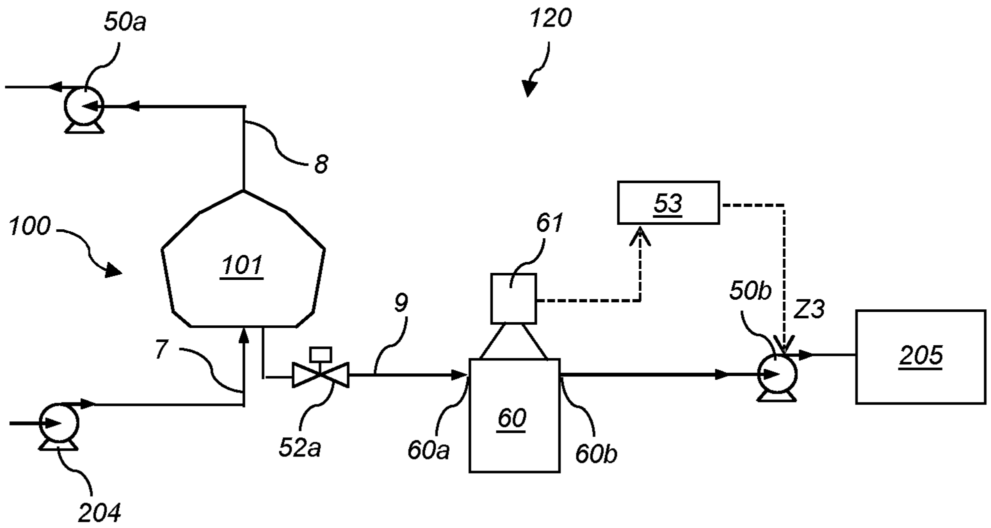
FIG. 3 is a schematic view of the separation system in which a peristaltic pump is used for regulating the flow to and from the container.

FIG. 3 illustrates an embodiment of a separation system 120 of the present disclosure. This separation system 120 has a similar set-up as the system 120 discussed in relation to FIG. 2, with the difference that the positive displacement pump 50*b* in the form of a peristaltic pump 50*b* is used for regulating the outflow of liquid light phase from the container 60. Consequently, in this embodiment, the control unit 53 is connected to the peristatic pump 50*b*, as illustrated by arrow "Z3" in FIG. 3. The control unit 53 is hence configured for regulating the liquid flow through the peristaltic pump 50*b*, such as the flow rate through peristaltic pump 50*b*. For this purpose, the processing unit may further comprise computer code instructions for sending operational requests to the peristaltic pump 50*b*.

As illustrated in FIGS. 1-3, with the use of the container 60 and scale 61 arranged downstream of the first liquid outlet, the separation system 120 may be free of any additional flow sensor arranged downstream of the first liquid outlet.

Figure 4:
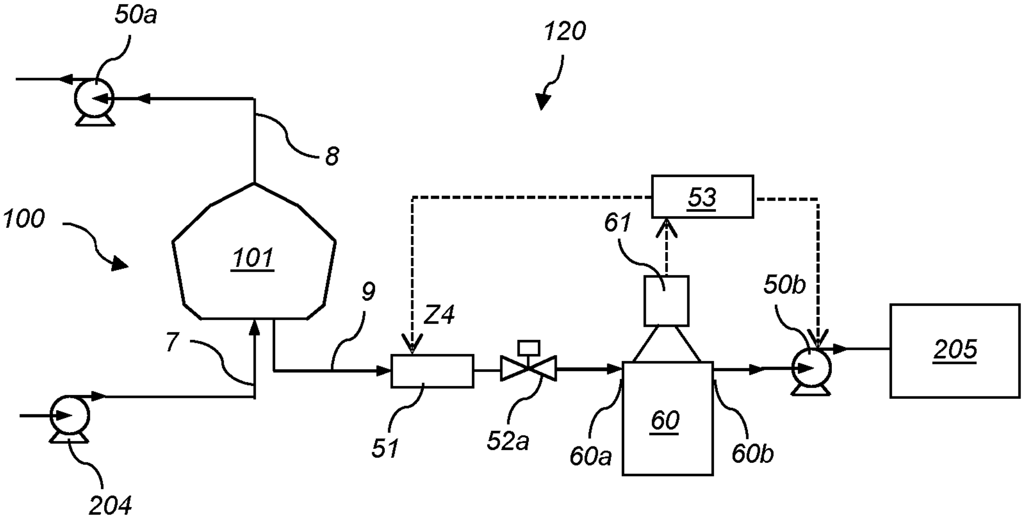
FIG. 4 is a schematic view of a separation system in which the measurements of the weight increase are used to calibrate a flow sensor.

However, as an alternative, the measurements of the weight increase as a function of time may be used for adjusting, such as calibrating, a flow sensor 51. Such an embodiment is illustrated in FIG. 4, in which the separation system 120 further comprises a flow sensor 51 arranged downstream of the first liquid outlet, i.e. downstream of the same liquid outlet as the container 60 and scale 61 is arranged.

The control unit 53 is in this embodiment further connected to the flow sensor 51, such that it may calibrate the flow sensor 51 based on the measured weight increase of the container 60 as a function of time. This is illustrated by arrow "Z4" in FIG. 4. Thus, the control unit 53 may comprise a communication interface, such as a transmitter/receiver, via which it may receive and send data to the flow sensor 51 for calibration based on the measured flow rate obtained from the measurements of the weight increase as a function of time of the container 60. Thus, the control unit 53 may be configured to compare a received flow rate from flow sensor 51 with a flow rate calculated by the measurements of the weight increase as a function of time of the container 60, and based on this comparison, the flow sensor 51 may be calibrated.

Figure 5:
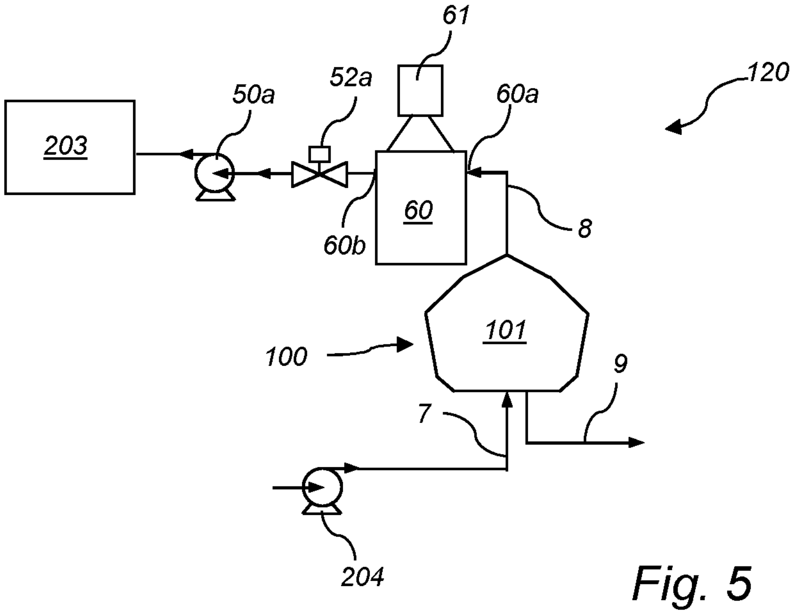
FIG. 5 is a schematic view of a separation system of the present disclosure in which a container and scale is arranged downstream the second liquid outlet.

It is to be understood that a container 60 as well as a scale 61 for measuring the weight of discharged liquid phase contained in the container 60 may be arranged downstream of the second liquid outlet as well, and may thus be used for measuring the flow rate of the discharged liquid heavy phase. This is illustrated in FIG. 5. Thus, the separation system 120 may comprise a container 60 and a scale 61 for measuring the weight of discharged liquid phase contained in the container 60 downstream either one of the liquid outlets or downstream both of the liquid outlets.

Figure 6:
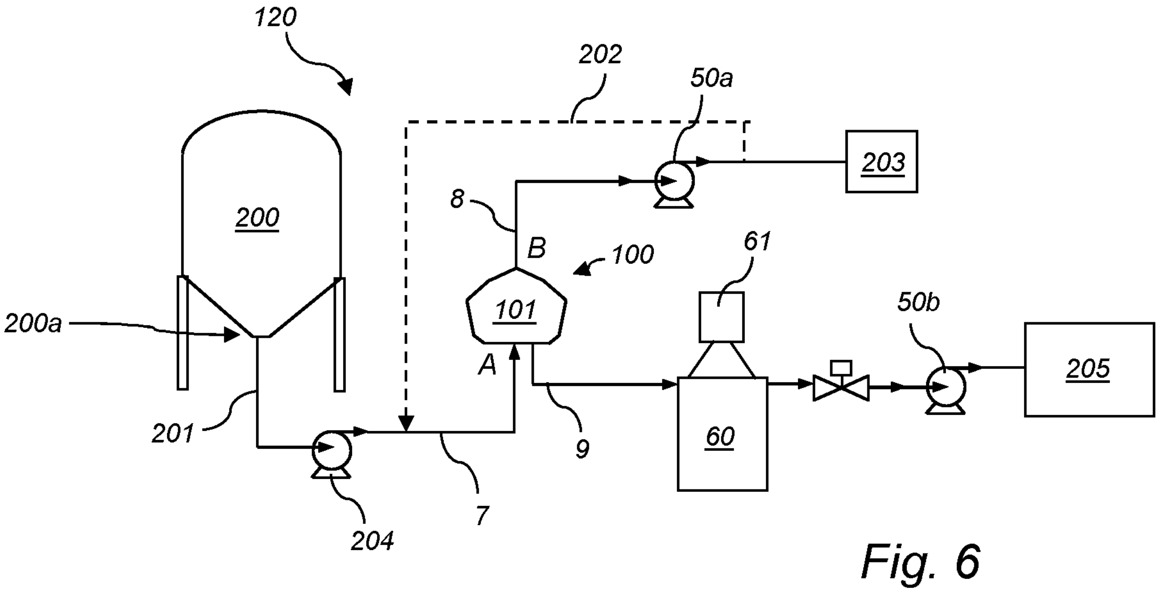
FIG. 6 is a schematic illustration of a separation system for separating a cell culture mixture.

FIG. 6 is a schematic illustration of a separation system 120 for separating a cell culture mixture in which a separator 100 as discussed in relation to FIGS. 1-4 is used. The system 120 comprises a fermenter tank 200 configured for comprising a cell culture mixture. The fermenter tank 200 has an axially upper portion and an axially lower portion 200*a*. Fermentation in the fermentation tank 200 may for example be for expression of an extracellular biomolecule, such as an antibody, from a mammalian cell culture mixture. After fermentation, the cell culture mixture is separated in a centrifugal separator 100 according to the present disclosure. As seen in FIG. 6, the bottom of the fermenter tank 200 is connected via a connection 201 to the bottom of the separator 100 to the inlet conduit 7 of the separator. The connection 201 may be a direct connection or a connection via any other processing equipment, such as a tank. Thus, the connection 201 allows for supply of the cell culture mixture from the axially lower portion 200*a* of the fermenter tank 200 to the inlet at the axially lower end of the centrifugal separator 100, as indicated by arrow "A". There is a feed pump 204 arranged for pumping the feed, i.e. the cell culture mixture from fermentation tank 200, to the inlet of the separator 100.

After separation, the separated cell phase of higher density is discharged via the second liquid outlet at the top of the separator to stationary outlet conduit 8, whereas the separated liquid light phase of lower density, comprising the expressed biomolecule, is discharged via the liquid light phase outlet at the bottom of the separator 100 to stationary outlet conduit 9.

The flow rate of the separated liquid light phase discharged via stationary outlet conduit 9 is determined by container 60 and scale 61, as discussed in relation to FIGS. 1-4 above, e.g. with the use of a control unit (not shown in FIG. 6) as discussed in relation to FIGS. 1-4 above.

The positive displacement pumps 50*a*, 50*b* may provide suction forces to the discharged liquid phases thus allowing for a lower feed pressure to be used with feed pump 204, which thus facilitates a more gentle treatment of the cells in the separator 100. As an alternative, the feed pump 204 may be completely omitted, and the cells may be drawn to the separator 100 solely by the use of the suction force generated by the positive displacement pumps 50*a*, 50*b*.

The separated cell phase may be discharged to a tank 203 for re-use in a subsequent fermentation process, e.g. in the fermenter tank 200. The separated cell phase may further be recirculated to the feed inlet of the separator 100, as indicated by connection 202. The separated liquid light phase may be discharged via outlet conduit 9 to further tank 205 or other process equipment for subsequent purification of the expressed biomolecule.

Figure 7:
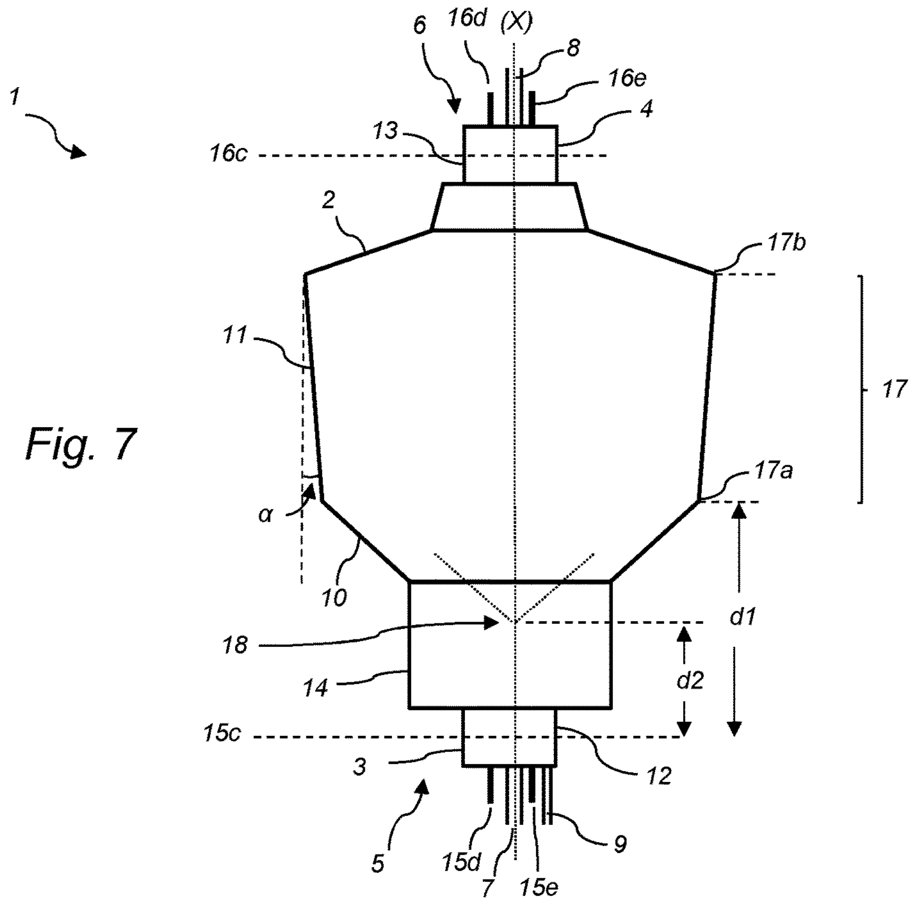
FIG. 7 is schematic outer side view of a rotor casing forming an exchangeable separation insert for a centrifugal separator for separating a cell culture mixture.
Figure 8:
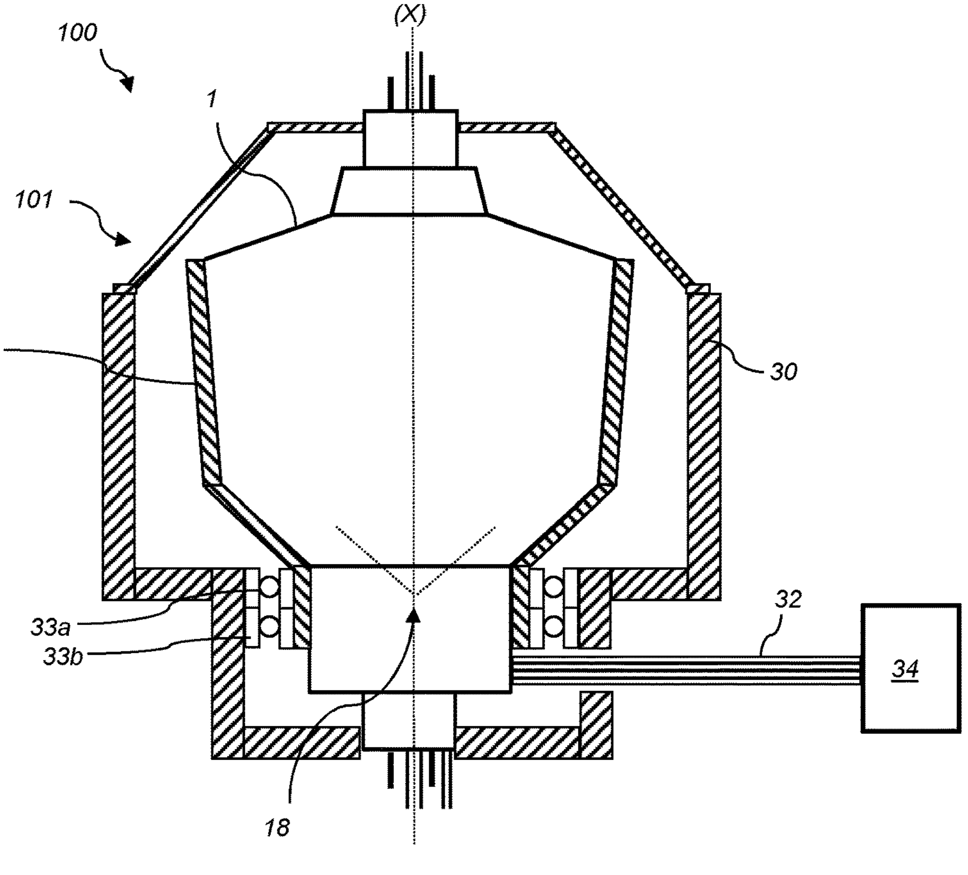
FIG. 8 is a schematic section of a centrifugal separator comprising an exchangeable insert as shown in FIG. 7.
Figure 9:
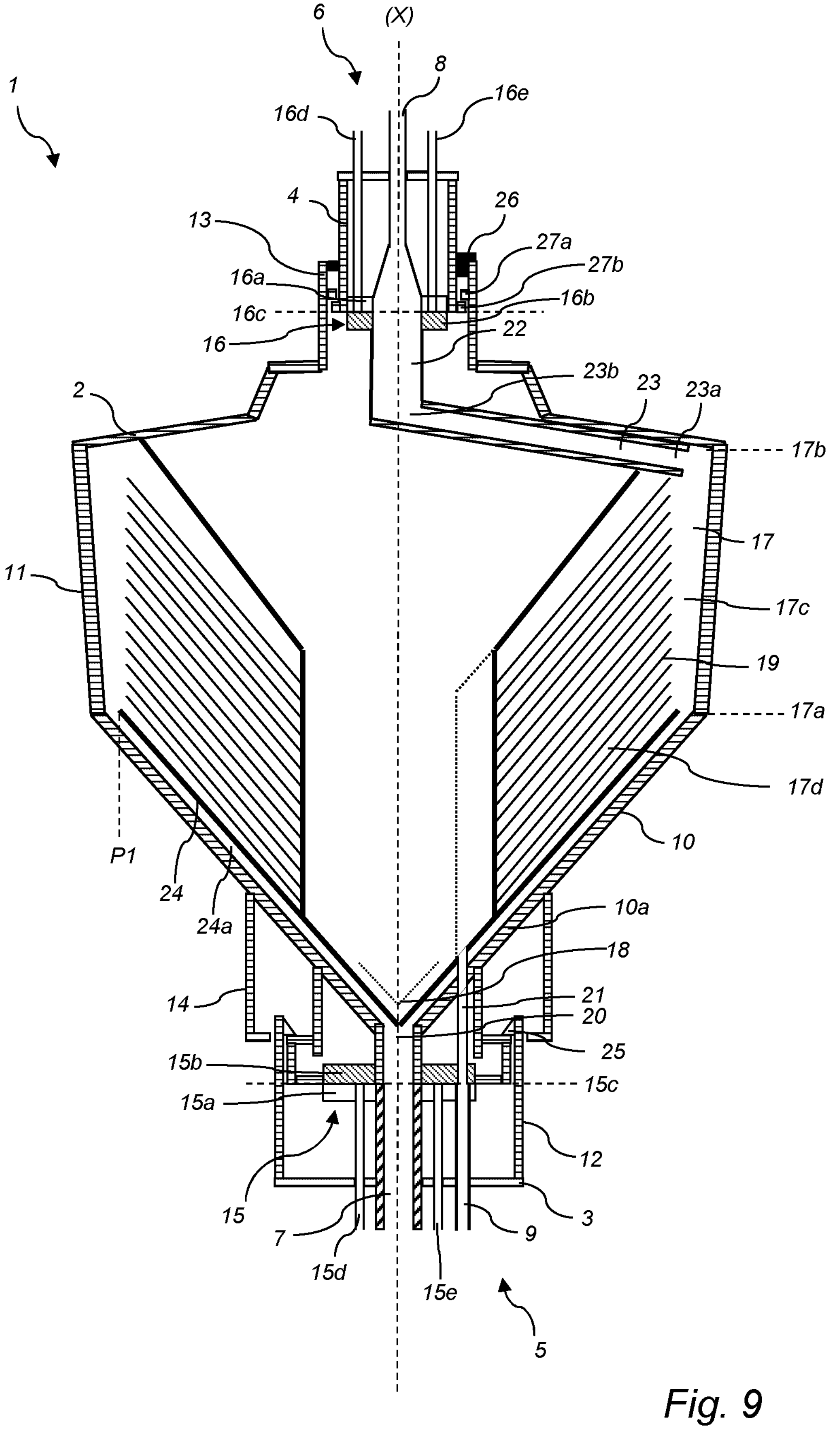
FIG. 9 is schematic section view of the exchangeable separation insert as shown in FIG. 7.

FIGS. 7-10 show in more detail example embodiments and details of centrifugal separators 100 that may be used in the separation system 120 of the present disclosure. FIGS. 7-9 schematically illustrates a centrifugal separator 100 in which the rotatable assembly 101 comprises an exchangeable separation insert 1 and a rotatable member 31. The insert 1 comprises a rotor casing 2 and is supported by the rotatable member 31.

FIG. 7 shows an outer side view of an exchangeable separation insert 1 that may be used in a centrifugal separator 100 of the present disclosure. The insert 1 comprises a rotor casing 2 arranged between a first, lower stationary portion 3 and a second, upper stationary portion 4, as seen in the axial direction defined by the axis of rotation (X). The first stationary portion 3 is arranged at the lower axial end 5 of the insert 1, whereas the second stationary portion 4 is arranged at the upper axial end 6 of the insert 1.

The feed inlet is in this example arranged at the axial lower end 5, and the feed is supplied via a stationary inlet conduit 7 arranged in the first stationary portion 3. The stationary inlet conduit 7 is arranged at the axis of rotation (X). The first stationary portion 3 further comprises a stationary outlet conduit 9 for the separated liquid phase of lower density, also called the separated liquid light phase.

There is further a stationary outlet conduit 8 arranged in the upper stationary portion 4 for discharge of the separated phase of higher density, also called the liquid heavy phase. Thus, in this embodiment, the feed is supplied via the lower axial end 5, the separated light phase is discharged via the lower axial end 5, whereas the separated heavy phase is discharged via the upper axial end 6.

The outer surface of the rotor casing 2 comprises a first 10 and second 11 frustoconical portion. The first frustoconical portion 10 is arranged axially below the second frustoconical portion 11. The outer surface is arranged such that the imaginary apex of the first 10 and second 11 frustoconical portions both point in the same axial direction along the axis of rotation (X), which in this case is axially downwardly towards the lower axial end 5 of the insert 1.

Furthermore, the first frustoconical portion 10 has an opening angle that is larger than the opening angle of the second frustoconical portion 11. The opening angle of the first frustoconical portion may be substantially the same as the opening angle of a stack of separation discs contained within the separation space 17 of the rotor casing 2. The opening angle of the second frustoconical portion 11 may be smaller than the opening angle of a stack of separation discs contained within the separation space of the rotor casing 2. As an example, the opening angle of the second frustoconical portion 11 may be such that the outer surface forms an angle a with rotational axis that is less than 10 degrees, such as less than 5 degrees. The rotor casing 2 having the two frustoconical portions 10 and 11 with imaginary apexes pointing downwards allows for the insert 1 to be inserted into a rotatable member 30 from above. Thus, the shape of the outer surface increases the compatibility with an external rotatable member 31, which may engage the whole, or part of the outer surface of the rotor casing 2, such as engage the first 10 and second 11 frustoconical portions.

There is a lower rotatable seal arranged within lower seal housing 12 which separates the rotor casing 2 from the first stationary portion 3 and an upper rotatable seal arranged within upper seal housing 13 which separates the rotor casing 2 from the second stationary portion 4. The axial position of the sealing interface within the lower seal housing 12 is denoted 15*c*, and the axial position of the sealing interface within the upper seal housing 13 is denoted 16*c*. Thus, the sealing interfaces formed between such stationary part 15*a*, 16*a* and rotatable part 15*b*, 16*b* of the first 15 and second 16 rotatable seals also form the interfaces or border between the rotor casing 2 and the first 15 and second 16 stationary portions of the insert 1, see also FIG. 9.

There are further provided a seal fluid inlet 15*d* and a seal fluid outlet 15*e* for supplying and withdrawing a seal fluid, such as a cooling liquid, to the first rotatable seal 15 and in analogy, a seal fluid inlet 16*d* and a seal fluid outlet 16*e* for supplying and withdrawing a seal fluid, such as a cooling liquid, to the second rotatable seal 16.

Shown in FIG. 7 is also the axial positions of the separation space 17 enclosed within the rotor casing 2. In this embodiment, the separation space is substantially positioned within the second frustoconical portion 11 of the rotor casing 2. The heavy phase collection space 17*c* of the separation space 17 extends at least from a first, lower, axial position 17*a* to a second, upper, axial position 17*b*, see also FIG. 9. The inner peripheral surface of the separation space 17 may form an angle with the axis of rotation (X) that is substantially the same as angle α, i.e. the angle between the outer surface of the second frustoconical portion 11 and the axis of rotation (X). The inner diameter of the separation space 17 may thus increase continuously from the first axial position 17*a* to the second axial position 17*b*. Angle α may be less than 10 degrees, such as less than 5 degrees.

The exchangeable separation insert 1 has a compact form that increases the manoeuvrability and handling of the insert 1 by an operator. As an example, the axial distance between the separation space 17 and the first stationary portion 3 at the lower axial end 5 of the insert may be less than 20 cm, such as less than 15 cm. This distance is denoted d1 in FIG. 7, and is in this embodiment the distance from the lowest axial position 17*a* of the heavy phase collection space 17*c* of the separation space 17 to the sealing interface 15*c* of the first rotatable seal 15. As a further example, if the separation space 17 comprises a stack of frustoconical separation discs, the frustoconical separation disc that is axially lowest in the stack and closest to the first stationary portion 3, may be arranged with an imaginary apex 18 positioned at an axial distance d2 from the first stationary portion 3 that is less than 10 cm, such as less than 5 cm. Distance d2 is in this embodiment the distance from the imaginary apex 18 of the axially lowermost separation disc to the sealing interface 15*c* of the first rotatable seal 15.

FIG. 8 shows a schematic drawing of the exchangeable separation insert 1 being inserted within centrifugal separator 100. The separator 100 comprises a stationary frame 30 and a rotatable member 31 that is supported by the frame by means of supporting means in the form of an upper and lower ball bearing 33*a*, 33*b*. The rotatable member 31 and the insert 1 thus form part of a rotatable assembly 101. There is also a drive unit 34, which in this case is arranged for rotating the rotatable member 31 around the axis of rotation 31 via drive belt 32. However, other driving means are possible, such as an electrical direct drive.

The exchangeable separation insert 1 is inserted and secured within the rotatable member 31. The rotatable member 31 thus comprises an inner surface for engaging with the outer surface of the rotor casing 2. The upper and lower ball bearings 33*a*, 33*b* are both positioned axially below the separation space 17 within the rotor casing 2 such that the cylindrical portion 14 of the outer surface of the rotor casing 2 is positioned axially at the bearing planes. The cylindrical portion 14 thus facilitates mounting of the insert within at least one large ball bearing. The upper and lower ball bearings 33*a*, 33*b* may have an inner diameter of at least 80 mm, such as at least 120 mm.

Further, as indicated in FIG. 8, the insert 1 is positioned within rotatable member 31 such that the imaginary apex 18 of the lowermost separation disc is positioned axially at or below at least one bearing plane of the upper and lower ball bearings 33*a*, 33*b*.

Moreover, the separation insert 1 is mounted within the separator 100 such that the axial lower part 5 of the insert 1 is positioned axially below the supporting means, i.e. the upper and lower bearings 33*a*, 33*b*. The rotor casing 2 is in this example arranged to be solely externally supported by the rotatable member 31. The separation insert 1 is further mounted within the separator 100 to allow easy access to the inlet and outlets at the top and bottom of the insert 1.

FIG. 9 shows a schematic illustration of cross-section of an embodiment of an exchangeable separation insert 1 that may form part of a centrifugal separator of the present disclosure. The insert 1 comprises a rotor casing 2 arranged to rotate around the axis of rotation (X) and arranged between a first, lower stationary portion 3 and a second, upper stationary portion 4. The first stationary portion 3 is thus arranged at the lower axial end 5 of the insert, whereas the second stationary portion 4 is arranged at the upper axial end 6 of the insert 1.

The feed inlet 20 is in this example arranged at the axial lower end 5, and the feed is supplied via a stationary inlet conduit 7 arranged in the first stationary portion 3. The stationary inlet conduit 7 may comprise a tubing, such as a plastic tubing. The stationary inlet conduit 7 is arranged at the axis of rotation (X) so that the material to be separated is supplied at the rotational centre. The feed inlet 20 is for receiving the fluid mixture to be separated.

The feed inlet 20 is in this embodiment arranged at the apex of an inlet cone 10*a*, which on the outside of the insert 1 also forms the first frustoconical outer surface 10. There is further a distributor 24 arranged in the feed inlet for distributing the fluid mixture from the inlet 24 to the separation space 17.

The separation space 17 comprises an outer heavy phase collection space 17*c* that extends axially from a first, lower axial position 17*a* to a second, upper axial position 17*b*. The separation space further comprises a radially inner space formed by the interspaces between the separation discs of the stack 19.

The distributor 24 has in this embodiment a conical outer surface with the apex at the axis of rotation (X) and pointing toward the lower end 5 of the insert 1. The outer surface of the distributor 24 has the same conical angle as the inlet cone 10*a*. There is further a plurality of distributing channels 24*a* extending along the outer surface for guiding the fluid mixture to be separated continuously axially upwards from an axially lower position at the inlet to an axially upper position separation space 17. This axially upper position is substantially the same as the first, lower axial position 17*a* of the heavy phase collection space 17*c* of the separation space 17. The distribution channels 24*a* may for example have a straight shape or a curved shape, and thus extend between the outer surface of the distributor 24 and the inlet cone 24*a*. The distribution channels 24 may be diverging from an axial lower position to an axial upper position. Furthermore, the distribution channels 24 may be in the form of tubes extending from an axial lower position to an axial upper position.

There is further a stack 19 of frustoconical separation discs arranged coaxially in the separation space 17. The separation discs in the stack 19 are arranged with the imaginary apex 18 pointing to the axially lower end 5 of the separation insert, i.e. towards the inlet 20. The imaginary apex 18 of the lowermost separation disc in the stack 19 may be arranged at a distance that is less than 10 cm from the first stationary portion 3 in the axial lower end 5 of the insert 1. The stack 19 may comprise at least 20 separation discs, such as at least 40 separation discs, such as at least 50 separation discs, such as at least 100 separation discs, such as at least 150 separation discs. For clarity reasons, only a few discs are shown in FIG. 9. In this example, the stack 19 of separation discs is arranged on top of the distributor 24, and the conical outer surface of the distributor 24 may thus have the same angle relative the axis of rotation (X) as the conical portion of the frustoconical separation discs. The conical shape of the distributor 24 has a diameter that is about the same or larger than the outer diameter of the separation discs in the stack 19. Thus, the distribution channels 24*a* may be arranged to guide the fluid mixture to be separated to an axial position 17*a* in the separation space 17 that is at a radial position $P_1$ that is outside the radial position of the outer circumference of the frustoconical separation discs in the stack 19.

The heavy phase collection space 17*c* of the separation space 17 has in this embodiment an inner diameter that continuously increases from the first, lower axial position 17*a* to the second, upper axial position 17*b*. There is further an outlet conduit 23 for transporting a separated heavy phase from the separation space 17. This conduit 23 extends from a radially outer position of the separation space 17 to the heavy phase outlet 22. In this example, the conduit is in the form of a single pipe extending from a central position radially out into the separation space 17. However, there may be at least two such outlet conduits 23, such as at least three, such as at least five, outlet conduits 23. The outlet conduit 23 has thus a conduit inlet 23*a* arranged at the radially outer position and a conduit outlet 23*b* at a radially inner position, and the outlet conduit 23 is arranged with an upward tilt from the conduit inlet 23*a* to the conduit outlet 23*b*. As an example, the outlet conduit may be tilted with an upward tilt of at least 2 degrees, such as at least five degrees, such as at least ten degrees, relative the horizontal plane.

The outlet conduit 23 is arranged at an axially upper position in the separation space 17, such that the outlet conduit inlet 23*a* is arranged for transporting separated heavy phase from the axially uppermost position 17*b* of the separation space 17. The outlet conduit 23 further extends radially out into the separation space 17 so that outlet conduit inlet 23*a* is arranged for transporting separated heavy phase from the periphery of the separation space 17, i.e. from the radially outermost position in the separation space at the inner surface of the separation space 17.

The conduit outlet 23*b* of the stationary outlet conduit 23 ends at the heavy phase outlet 22, which is connected to a stationary outlet conduit 8 arranged in the second, upper stationary portion 4. Separated heavy phase is thus discharged via the top, i.e. at the upper axial end 6, of the separation insert 1.

Furthermore, separated liquid light phase, which has passed radially inwards in the separation space 17 through the stack of separation discs 19, is directed to the liquid light phase outlet 21 arranged at the axially lower end of the rotor casing 2. The liquid light phase outlet 21 is connected to a stationary outlet conduit 9 arranged in the first, lower stationary portion 3 of the insert 1. Thus, separated liquid light phase is discharged via the first, lower, axial end 5 of the exchangeable separation insert 1.

The stationary outlet conduit 9 arranged in the first stationary portion 3 and the stationary heavy phase conduit 8 arranged in the second stationary portion 4 may comprise tubing, such as plastic tubing.

There is lower rotatable seal 15, which separates the rotor casing 2 from the first stationary portion 3, arranged within lower seal housing 12 and an upper rotatable seal 16, which separates the rotor casing from the second stationary portion 4, arranged within upper seal housing 13. The first 15 and second 16 rotatable seals are hermetic seals forming mechanically hermetically sealed inlet and outlets.

The lower rotatable seal 15 may be attached directly to the inlet cone 10*a* without any additional inlet pipe, i.e. the inlet may be formed at the apex of the inlet cone directly axially above the lower rotatable seal 15. Such an arrangement enables a firm attachment of the lower mechanical seal at a large diameter to minimize axial run-out.

The lower rotatable seal 15 seals and connects both the inlet 20 to the stationary inlet conduit 7 and seals and connects the liquid light phase outlet 21 to the stationary liquid light phase conduit 9. The lower rotatable seal 15 thus forms a concentric double mechanical seal, which allows for easy assembly with few parts. The lower rotatable seal 15 comprises a stationary part 15*a* arranged in the first stationary portion 3 of the insert 1 and a rotatable part 15*b* arranged in the axially lower portion of the rotor casing 2. The rotatable part 15*b* is in this embodiment a rotatable sealing ring arranged in the rotor casing 2 and the stationary part 15*a* is a stationary sealing ring arranged in the first stationary portion 3 of the insert 1. There are further means (not shown), such as at least one spring, for bringing the rotatable sealing ring and the stationary sealing ring into engagement with each other, thereby forming at least one sealing interface 15*c* between the rings. The formed sealing interface extends substantially in parallel with a horizontal plane with respect to the axis of rotation (X). This sealing interface 15*c* thus forms the border or interface between the rotor casing 2 and the first stationary portion 3 of the insert 1. There are further connections 15*d* and 15*e* arranged in the first stationary portion 3 for supplying a liquid, such as a cooling liquid, buffer liquid or barrier liquid, to the lower rotatable seal 15. This liquid may be supplied to the interface 15*c* between the sealing rings.

In analogy, the upper rotatable seal 16 seals and connects the heavy phase outlet 22 to the stationary outlet conduit 8. The upper mechanical seal may also be a concentric double mechanical seal. The upper rotatable seal 16 comprises a stationary part 16*a* arranged in the second stationary portion 4 of the insert 1 and a rotatable part 16*b* arranged in the axially upper portion of the rotor casing 2. The rotatable part 16*b* is in this embodiment a rotatable sealing ring arranged in the rotor casing 2 and the stationary part 16*a* is a stationary sealing ring arranged in the second stationary portion 4 of the insert 1. There are further means (not shown), such as at least one spring, for bringing the rotatable sealing ring and the stationary sealing ring into engagement with each other, thereby forming at least one sealing interface 16*c* between the rings. The formed sealing interface 16*c* extends substantially in parallel with the horizontal plane with respect to the axis of rotation (X). This sealing interface 16*c* thus forms the border or interface between the rotor casing 2 and the second stationary portion 4 of the insert 1. There are further connections 16*d* and 16*e* arranged in the second stationary portion 4 for supplying a liquid, such as a cooling liquid, buffer liquid or barrier liquid, to the upper rotatable seal 16. This liquid may be supplied to the interface 16*c* between the sealing rings.

Furthermore, FIG. 9 shows the exchangeable separation insert 1 in a transport mode. In order to secure the first stationary portion 3 to the rotor casing 2 during transport, there is a lower securing means 25 in the form of a snap fit that axially secures the lower rotatable seal 15 to the cylindrical portion 14 of rotor casing 2. Upon mounting the exchangeable insert 1 in a rotating assembly, the snap fit 25 may be released such that the rotor casing 2 becomes rotatable around axis (X) at the lower rotatable seal.

Moreover, during transport, there is an upper securing means 27*a,b* that secures the position of the second stationary portion 4 relative the rotor casing 2. The upper securing means is in the form of an engagement member 27*a* arranged on the rotor casing 2 that engages with an engagement member 27*b* on the second stationary portion 4, thereby securing the axial position of the second stationary portion 4. Further, there is a sleeve member 26 arranged in a transport or setup position in sealing abutment with the rotor casing 2 and the second stationary portion 4. The sleeve member 26 is further resilient and may be in the form of a rubber sleeve. The sleeve member is removable from the transport or setup position for permitting the rotor casing 2 to rotate in relation to the second stationary portion 4. Thus, the sleeve member 26 seals radially against the rotor casing 2 and radially against the second stationary portion 4 in the setup or transport position. Upon mounting the exchangeable insert 1 in a rotating assembly, the sleeve member may be removed and an axial space between engagement members 27*a* and 27*b* may be created in order to allow rotation of the rotor casing 2 relative the second stationary portion 4.

The lower and upper rotatable seals 15,16 are mechanical seals, hermetically sealing the inlet and the two outlets.

During operation, the exchangeable separation insert 1, inserted into a rotatable member 31, is brought into rotation around the axis of rotation (X). Liquid mixture to be separated is supplied via stationary inlet conduit 7 to the inlet 20 of the insert, and is then guided by the guiding channels 24 of the distributor 24 to the separation space 17. Thus, the liquid mixture to be separated is guided solely along an upwards path from the inlet conduit 7 to the separation space 17. Due to a density difference the liquid mixture is separated into a liquid light phase and a liquid heavy phase. This separation is facilitated by the interspaces between the separation discs of the stack 19 fitted in the separation space 17. The separated liquid heavy phase is directed from the periphery of the separation space 17 by the outlet conduit 23 and is directed out via the heavy phase outlet 22 arranged at the axis of rotation (X) to the stationary heavy phase outlet conduit 8. Separated liquid light phase is forced radially inwards through the stack 19 of separation discs and led via the liquid light phase outlet 21 out to the stationary light phase conduit 9.

Consequently, in this embodiment, the feed is supplied via the lower axial end 5, the separated light phase is discharged via the lower axial end 5, whereas the separated heavy phase is discharged via the upper axial end 6.

Further due to the arrangement of the inlet 20, distributor 24, stack 19 of separation discs and the outlet conduit 23 as disclosed above, the exchangeable separation insert 1 1 is de-aerated automatically, i.e. the presence of air-pockets is eliminated or decreased so that any air present within the rotor casing is forced to travel unhindered upwards and out via the heavy phase outlet. Thus, at stand-still, there are no air pockets, and if the insert 1 is filled up through the feed inlet, all air may be vented out through the heavy phase outlet 22. This also facilitates filling the separation insert 1 at standstill and start rotating the rotor casing when liquid mixture to be separated or buffer fluid for the liquid mixture is present within the insert 1.

As also seen in FIG. 9, the exchangeable separation insert 1 has a compact design. As an example, the axial distance between the imaginary apex 18 of the lowermost separation disc in the stack 19 may be less than 10 cm, such as less than 5 cm, from the first stationary portion 3, i.e. less than 10 cm, such as less than 5 cm, from the sealing interface 15*c* of the lower rotatable seal 15.

Further, the rotatable part of the first rotatable seal may be arranged directly onto the axially lower portion of the rotor casing.

The centrifugal separator of the present disclosure may also be a centrifugal separator in which the rotatable assembly does not comprise a single use insert. In embodiments, the rotatable assembly comprises a spindle arranged to rotate coaxially with the rotor casing and the spindle may rotatably supported by the stationary frame via at least one bearing.

Thus, the rotor casing may be arranged at an end of a rotatable spindle, and this spindle may be supported in the frame by at least one bearing device, such as by at least one ball-bearing.

As an example, said spindle may comprise a central duct arranged around the axis of rotation (X) and in fluid connection with said inlet, and wherein said first rotatable seal is sealing and connecting said central duct to said stationary inlet conduit.

Thus, the spindle may be a hollow spindle and may be used for supplying feed to the inlet. The spindle may further comprise an outer annular duct for discharging a separated liquid phase, such as the separated liquid light phase.

Figure 10:
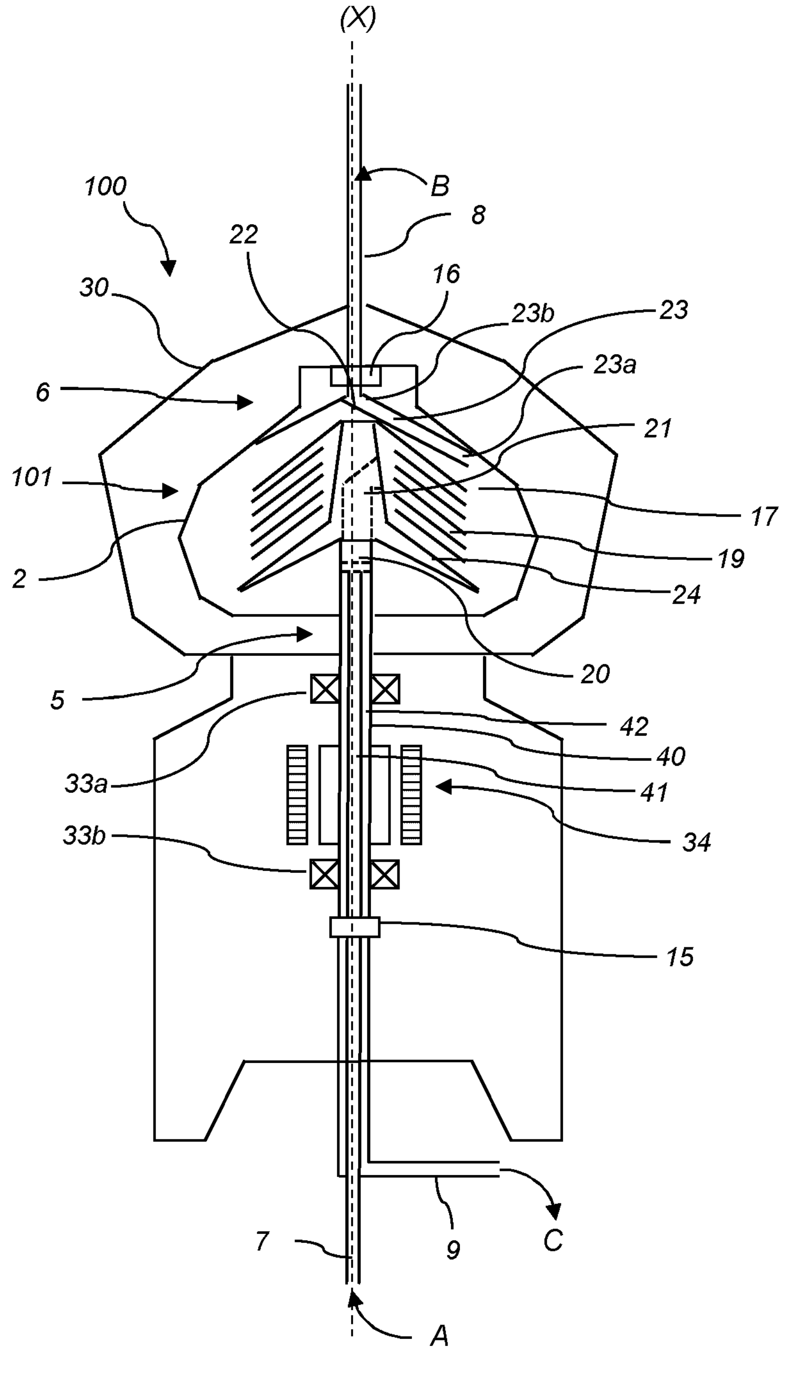
FIG. 10 is a schematic section of an embodiment of a centrifugal separator.

FIG. 10 shows in more detail a centrifugal separator 100 in which the rotatable assembly comprises a rotatable hollow spindle. The separator 100 is configured for separating a liquid mixture in the form of a cell culture mixture into a cell phase and a liquid light phase, e.g. comprising an expressed biomolecule.

The separator 100 comprises a frame 30, a hollow spindle 40, which is rotatably supported by the frame 30 in a bottom bearing 33*b* and a top bearing 33*a*, and a rotatable member 1 having a rotor casing 2. The rotor casing 2 is adjoined to the axially upper end of the spindle 40 to rotate together with the spindle 40 around the axis (X) of rotation. The rotor casing 2 encloses a separation space 17 in which a stack 19 of separation discs is arranged in order to achieve effective separation of a cell culture mixture that is processed. The separation discs of the stack 19 have a frustoconical shape with the imaginary apex pointing axially downwards and are examples of surface-enlarging inserts. The stack 19 is fitted centrally and coaxially with the rotor casing 2. In FIG. 10, only a few separation discs are shown. The stack 19 may for example contain above 100 separation discs, such as above 200 separation discs.

The rotor casing 2 has a mechanically hermetically sealed liquid outlet 21 for discharge of a separated liquid light phase, and a heavy phase outlet 22 for discharge of a phase of higher density than the separated liquid light phase. The liquid light phase may thus contain an extracellular biomolecule that has been expressed by the cells during fermentation and the separated heavy phase may be a separated cell phase.

There is a single outlet conduit 23 in the form of a pipe for transporting separated heavy phase from the separation space 17. This conduit 23 extends from a radially outer position of the separation space 17 to the heavy phase outlet 22. The conduit 23 has a conduit inlet 23*a* arranged at the radially outer position and a conduit outlet 23*b* arranged at a radially inner position. Further the outlet conduit 23 is arranged with an upward tilt relative the horizontal plane from the conduit inlet 23*a* to the conduit outlet 23*b*.

There is also a mechanically hermetically sealed inlet 20 for supply of the liquid mixture to be processed to said separation space 17 via the distributor 24. The inlet 20 is in this embodiment connected to central duct 41 extending through the spindle 40, which thus takes the form of a hollow, tubular member. Introducing the liquid mixture from the bottom provides a gentle acceleration of the feed. The spindle 40 is further connected to a stationary inlet pipe 7 at the bottom axial end of the separator 100 via a hermetic seal 15, such that the liquid mixture to be separated may be transported to the central duct 41, e.g. by means of a feed pump. The separated liquid light phase is in this embodiment discharged via an outer annular duct 42 in said spindle 40. Consequently, the separated liquid phase of lower density is discharged via the bottom of the separator 100.

A first mechanical hermetic seal 15 is arranged at the bottom end to seal the hollow spindle 40 to the stationary inlet pipe 7. The hermetic seal 15 is an annular seal that surrounds the bottom end of the spindle 40 and the stationary pipe 7. The first hermetic seal 15 is a concentric double seal that seals both the inlet 21 to the stationary inlet pipe 7 and the liquid light phase outlet 21 to a stationary outlet pipe 9. There is also a second mechanical hermetic seal 16 that seals the heavy phase outlet 22 at the top of the separator 100 to a stationary outlet pipe 8.

As seen in FIG. 10, the inlet 20, and the cell phase outlet 22 as well as the stationary outlet pipe 8 for discharging separated cell phase are all arranged around axis of rotation (X) so that liquid mixture to be separated enters the rotor casing 2 at the axis of rotation (X), as indicated by arrow "A", and the separated heavy phase is discharged at the axis of rotation (X), as indicated by arrow "B". The discharged liquid light phase is discharged at the bottom end of the centrifugal separator 100, as illustrated by arrow "C".

The centrifugal separator 100 is further provided with a drive motor 34. This motor 34 may for example comprise a stationary element and a rotatable element, which rotatable element surrounds and is connected to the spindle 40 such that it transmits driving torque to the spindle 40 and hence to the rotor casing 2 during operation. The drive motor 34 may be an electric motor. Furthermore, the drive motor 34 may be connected to the spindle 40 by transmission means. The transmission means may be in the form of a worm gear which comprises a pinion and an element connected to the spindle 40 in order to receive driving torque. The transmission means may alternatively take the form of a propeller shaft, drive belts or the like, and the drive motor 34 may alternatively be connected directly to the spindle 40.

During operation of the separator in FIG. 10, rotatable assembly 101 and thus rotor casing 2 are caused to rotate by torque transmitted from the drive motor 34 to the spindle 40. Via the central duct 41 of the spindle 40, liquid mixture to be separated is brought into the separation space 17 via inlet 20. The inlet 20 and the stack 19 of separation discs are arranged so that the liquid mixture enters the separation space 19 at a radial position that is at, to or radially outside, the outer radius of the stack 19 of separation discs.

However, the distributor 24 may also be arranged to supply the liquid or fluid to be separated to the separation space at a radial position that is within the stack of separation discs, e.g. by axial distribution openings in the distributor and/or the stack of separation discs. Such openings may form axial distribution channels within the stack.

In the hermetic type of inlet 20, the acceleration of the liquid material is initiated at a small radius and is gradually increased while the liquid leaves the inlet and enters the separation space 17. The separation space 17 is intended to be completely filled with liquid during operation. In principle, this means that preferably no air or free liquid surfaces is meant to be present within the rotor casing 2. However, liquid mixture may be introduced when the rotor is already running at its operational speed or at standstill. Liquid mixture, such as a cell culture, may thus be continuously introduced into the rotor casing 2.

Due to a density difference, the liquid mixture is separated into a liquid light phase and a phase of higher density (heavy phase). This separation is facilitated by the interspaces between the separation discs of the stack 19 fitted in the separation space 17. The separated heavy phase is collected from the periphery of the separation space 17 by conduit 23 and forced out through outlet 22 arranged at the axis of rotation (X), whereas separated liquid light phase is forced radially inwards through the stack 19 and then led out through the annular outer duct 42 in the spindle 40.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A separation system for separating a liquid mixture comprising:

a centrifugal separator, wherein the centrifugal separator comprises:

a stationary frame;

a rotatable assembly having a removable insert and a driver for rotating the rotatable assembly relative to the frame around an axis of rotation;

a feed inlet for receiving a liquid mixture to be separated; and a first liquid outlet for discharge of a separated liquid light phase and a second liquid outlet for discharge of a liquid heavy phase having a density that is higher than said liquid light phase, wherein the rotatable assembly comprises a rotor casing enclosing a separation space in which a stack of separation discs is arranged to rotate around said axis of rotation, wherein the separation space is arranged for receiving liquid mixture from said feed inlet;

a container arranged downstream of said first and/or second liquid outlet of the centrifugal separator and arranged for receiving discharged liquid phase;

a scale for measuring a weight of discharged liquid phase contained in said container, the container suspended from the scale;

a control unit configured for determining the weight increase of said container as a function of time and determining a flow rate of discharged liquid phase based on the measured weight increase of said container as a function of time and for cyclically filling and emptying the-container; and a tank for receiving liquid phase being emptied from the container, wherein said container comprises a container inlet for receiving said discharged liquid phase and a container outlet for emptying the liquid phase from the container.

2. The separation system according to claim 1, further comprising a first valve for regulating the flow of liquid phase being emptied from the container.

3. The separation system according to claim 2, wherein the control unit is further configured to control said first valve, and further configured to close said first valve during said determining of the weight increase of said container as a function of time.

4. The separation system according to claim 3, wherein the control unit is further configured to open said first valve such that an outlet flow of liquid phase from said container is higher than an inlet flow of liquid phase to said container; thereby emptying said container.

5. The separation system according to claim 4, wherein the control unit is configured to switch between closing the first valve and opening the first valve such that said container is filled and emptied in cycles.

6. The separation system according to claim 2, wherein the container is arranged downstream of the first liquid outlet.

7. The separation system according to claim 2, further comprising a second valve between the first liquid outlet and the container.

8. The separation system according to claim 1, wherein the container is arranged downstream of the first liquid outlet.

9. The separation system according to claim 1, wherein the separation system is free of any flow sensor arranged downstream of a liquid outlet at which said container is arranged.

10. The separation system according to claim 1, wherein the container is arranged downstream of the first liquid outlet.

11. A method for determining a flow rate of a liquid phase being discharged from a centrifugal separator, comprising the steps of:

a) providing the separation system according to claim 1;

b) supplying feed to said feed inlet and discharging a separated liquid light phase from said first liquid outlet and discharging a separated liquid heavy phase from said second liquid outlet;

c) measuring a weight increase of said container as a function of time; and d) determining a flow rate of said liquid phase being discharged to said container based on the measured weight increase of step c).

12. The method according to claim 11, wherein step c) further comprises step c1) of stopping a flow of separated liquid phase out from said container during said measuring of the weight increase of said container as a function of time.

13. The method according to claim 12, wherein step c) further comprises step c2) of starting the flow of separated liquid phase out from said container, thereby emptying said container after said measuring of the weight increase of said container as a function of time.

14. The method according to claim 13, wherein step c) comprises repeating steps c1) and c2).

15. The method according to claim 11, further comprising adjusting a flow sensor arranged downstream of the same liquid outlet at which said container is arranged based on the determined flow of said liquid phase in step d).

* * * * *